Patented Dec. 18, 1951

2,578,787

UNITED STATES PATENT OFFICE 2,578,787

REDUCTION OF ENAMINES

Peter L. de Benneville, Philadelphia, Pa., assignor to Rohm & Haas Company, Philadelphia, Pa., a corporation of Delaware No Drawing. Application April 9, 1949, Serial No. 86,595

10 Claims. (Cl. 260—247)

This invention relates to a method for the preparation of tertiary amines. More particularly, it concerns the reduction of enamines with formic acid to yield tertiary amines. The reaction involved may be represented

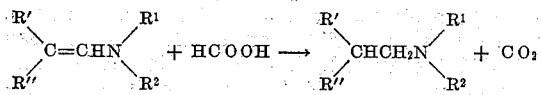

where R' is hydrogen or a hydrocarbon group, R'' is a hydrocarbon group or an ether-containing group, and $R^1$ and $R^2$ are hydrocarbon groups, which are joined to nitrogen at a non-aromatic carbon atom thereof, or hydroxyalkyl groups when taken individually but, when taken together, $R^1$ and $R^2$ form a saturated divalent chain having four to five carbon atoms which forms a five- to six-sided heterocycle with the nitrogen.

The preparation of enamines is described by Mannich and Davidsen in Berichte, 69B, 2106 (1935). Any aldehyde which has a hydrogen atom on an aliphatic carbon atom contiguous to the carbonyl group can be reacted with a secondary amine in the presence of a mild alkaline dehydrating catalyst such as lime or potassium carbonate to form an addition product from which there is separated on distillation under reduced pressure an enamine. Amines which have an aryl group bound to the nitrogen atom thereof do not give good results in this reaction, but other secondary monoamines are satisfactory whether containing two separate aliphatic cycloaliphatic or arylaliphatic N-substitutents or containing a divalent chain to form a heterocycle as in pyrrolidine, piperidine, morpholine, or thiamorpholine.

It has now been found that the enamines which can be thus prepared are reduced when heated with formic acid. Such a process has obvious advantages over one in which the olefinic linkage of the enamine is catalytically reduced with hydrogen under pressure.

As aldehydes for preparation of the enamines there may be used propionaldehyde, butyraldehyde, isobutyraldehyde, valeraldehyde, isovaleraldehyde, methylethylacetaldehyde, methylpropylacetaldehyde, hexaldehyde, 2-ethylbutaldehyde, heptaldehyde, isoheptaldehyde, octaldehyde, 2-ethylhexaldehyde, 5,5-dimethylhexaldehyde, nonaldehyde, 3,5,5-trimethylhexaldehyde, decaldehyde, dodecaldehyde, hexadecaldehyde, phenylacetaldehyde, alpha - methyl - alpha-phenylacetaldehyde, alpha-ethyl-alpha-phenylacetaldehyde, alpha-butyl-alpha-phenylacetalde-hyde, beta-phenylpropionaldehyde, mixtures of alpha-methyl-alpha - phenylacetaldehyde and beta-phenylpropionaldehyde, gamma-phenylbutyraldehyde, alpha-methyl-beta-phenylpropionaldehyde, mixtures of the last two aldehydes, phenoxypropionaldehyde, butylphenylpropionaldehyde, cyclohexylacetaldehyde, beta-cyclohexylpropionaldehyde, alpha - cyclohexylpropionaldehyde, methoxypropionaldehyde, butoxypropionaldehyde, and the like. The aldehydes may be summarized by the formula

wherein R' is hydrogen or a hydrocarbon group, particularly a lower alkyl group of not over four carbon atoms, and R'' is a hydrocarbon group or a hydrocarbon chain interrupted by ether oxygen, particularly alkyl, aryl, aralkyl, cycloalkyl, alkoxyalkyl, and phenoxyalkyl groups, particularly where such groups contain not over 16 carbon atoms.

As secondary amines for reaction with an aldehyde, there is used a secondary amine in which an aryl nucleus is not bound to the amine nitrogen. One valence of the nitrogen must, of course, be satisfied with a hydrogen atom. The other two valences are satisfied with the same groups or with different groups or with a divalent group which forms a heterocycle with the nitrogen atom. Typical secondary amines which are useful for preparation of enamines are dimethylamine, diethylamine, dipropylamine, diisopropylamine, diallylamine, dibutylamine, diamylamine, methylallylamine, methylamylamine, methyloctylamine, methylnonylamine, methyldecylamine, methyldodecylamine, methylbenzylamine, methylcyclohexylamine, diethanolamine, dipropanolamine, hydroxyethylmethylamine, morpholine, dimethylmorpholine, thiamorpholine, pyrrolidine, piperidine, alpha-methylpiperidine, 2,4-dimethylpiperidine, and the like.

As Mannich and Davidsen show, one mole of an aldehyde of the type shown above and two moles of a non-aromatic secondary amine; i. e., an amine in which nitrogen is not directly bound to an aryl ring, are reacted together at 0° to 50° C. in the presence of a mild, alkaline dehydrating catalyst such as potassium carbonate or lime, to form a diimine. This is then heated with elimination of one mole of amine and formation of an enamine. These are bases which can for the most part be distilled under reduced pressure, but which are quickly decomposed in acid solution to yield aldehyde and amine salt. They are relatively unstable to storage.

To convert an enamine to a tertiary amine free of the olefinic linkage in the alpha, beta-position with reference to the amine nitrogen, one equivalent of the enamine is reacted with an equivalent of formic acid at 50° to 100° C. Carbon dioxide is slowly evolved and an excellent conversion to the desired tertiary amine is obtained. This amine is a typical organic base having the wide range of utility of such amines. It forms stable acid salts. It can be converted to quaternary salts by reaction with alkylating agents.

The crude tertiary amine may be purified by conversion to an acid salt which is soluble in water. Organic matter may be separated or extracted therefrom. The amine may then be regenerated from the salt upon neutralization of the acid. Many of the tertiary amines may be distilled and thus purified.

When more than one equivalent of formic acid is used per mole of enamine, there is formed in addition to tertiary amine an amine formate, which can be distilled at higher temperatures than the amine itself. This product is found to have the empirical formula

R'CH(R")CH$_2$NR$^1$R$^2$·2HCOOH

This compound upon treatment with a strong base yields the desired tertiary amine.

Reaction between enamine and formic acid may usually be carried out by the gradual addition of formic acid to the enamine with satisfactory yields. When the enamine has hydrogen as R', it is generally desirable to perform the reduction under acid conditions. This is accomplished by gradual addition of enamine to formic acid. When R' is a hydrocarbon group, either of the reactants may be added to the other.

Typical preparations illustrating the procedures described above are presented in the examples. The parts given are by weight.

Example 1

To a mixture of 174 parts of morpholine and 45 parts of anhydrous potassium carbonate was added 72 parts of freshly distilled n-butyraldehyde dropwise over a period of an hour while the mixture was stirred and the temperature held between 5° and 10° C. The mixture was then stirred 30 minutes at 5° C. and filtered. The potassium carbonate was washed with ether. The combined filtrate and ether washings were distilled through a Vigreux column with return reflux to yield 54 parts of recovered morpholine, distilling between 55° and 60° C./30 mm. There were recovered 10.5 parts of aldehyde, distilling at 35°–56° C./3 mm., and, finally, 134 parts of the enamine, n-butenylmorpholine, boiling at 61° C./5 mm. The product had a neutralization equivalent of 134 compared to the theoretical value of 141.

Forty parts of n-butenylmorpholine was added dropwise during the course of one hour to 18 parts of 98–100% formic acid while the mixture was stirred at 60° C. Carbon dioxide was rapidly evolved. The temperature rose from 60° to 100° C. Finally the reaction mixture was heated for fifteen minutes on the steam-bath after evolution of carbon dioxide had ceased. The resulting product was added to 200 parts of 18% hydrochloric acid and was extracted with ether to remove non-basic products. The acid solution was made very basic with sodium hydroxide with good cooling. It was extracted with ether several times and the ether extract was dried over sodium sulfate and distilled to yield 22 parts of n-butylmorpholine distilling at 85°–99° C./25 mm. This product had a neutralization equivalent of 144 (theory 143) and contained 9.70% of nitrogen (theory 9.78%).

Example 2

To a stirred mixture of 174 parts of morpholine and 50 parts of anhydrous potassium carbonate at 5°–15° C. was added 72 parts of redistilled isobutyraldehyde over a period of 30 minutes. The reaction mixture was stirred for one hour at 10°–15° C., filtered, and distilled to yield 122 parts of recovered morpholine distilling at 55°–85° C./20 mm. and finally 41 parts of the desired isobutenylmorpholine distilling at 89°–93° C./20 mm. The product had a neutralization equivalent of 136 (theory 141) and contained 10.0% of nitrogen (theory 9.92%).

To 30 parts of the enamine was added 10.8 parts of 98–100% formic acid while the mixture was stirred at 30°–40° C. The mixture was stirred for one hour more at room temperature and then for one and one-half hours at 60°–90° C. until evolution of carbon dioxide had ceased. The product was dissolved in ether and washed with 50% sodium hydroxide solution, dried, and fractionated to yield 22 parts of isobutylmorpholine distilling at 80°–85° C./20 mm. This tertiary amine had a neutralization equivalent of 141 (theory 143) and a nitrogen content of 9.83% (theory 9.78%).

Example 3

To a stirred mixture of 84 parts of piperidine and 25 parts of anhydrous potassium carbonate at 60° C. was added 57 parts of freshly distilled n-heptaldehyde over a period of 15 minutes. The reaction mixture was maintained at 50°–60° C. for one hour, filtered, and fractionated to yield 32 parts of recovered piperidine, distilling at 40°–50° C./55 mm. and 54 parts of heptenyl piperidine, distilling at 111°–112° C./3 mm.

Forty-five parts of n-heptenylpiperidine was added dropwise over a period of one hour to 23 part of 98–100% formic acid while the mixture was stirred at 60°–70° C. Heating was continued for one more hour at the same temperature. The product was purified by solution in hydrochloric acid, followed by ether extraction and addition of base to the aqueous layer. It was distilled through a column to yield 38 parts of n-heptylpiperidine distilling at 78°–82° C./1 mm. The following data were obtained by analysis: The neutralization equivalent was 186, the hydrogen content 13.8%, the nitrogen content 7.47%, and the carbon content 78.0% while the theoretical values for this compound are: Neutralization equivalent 183, hydrogen content, 13.7%, nitrogen content 7.65%, and carbon content 78.6%.

Example 4

To a mixture of 13 parts of anhydrous potassium carbonate and 52.2 parts of morpholine was added 38.4 parts of 2-ethylhexaldehyde dropwise with stirring at 34°–42° C. over a period of one hour with occasional cooling. The mixture was stirred 30 minutes longer while the temperature fell to room temperature. The mixture was then filtered and distilled to yield 45.5 parts of recovered morpholine, a small intermediate fraction, and finally 24.5 parts of 2-ethylhexenylmorpholine, distilling at 95°–115° C./1 mm.

To 29.6 parts of 2-ethylhexenylmorpholine was slowly added 6.9 parts of 98–100% formic acid while the mixture was stirred at 50° C. After the mixture had been heated for three hours at 50° C., the product separated into a large upper layer and a small lower layer. The latter, which was probably an amine formate, was discarded and the upper layer was distilled to yield 18 parts of 2-ethylhexylmorpholine distilling at 87°–104° C./3 mm. This material was redistilled through a small Vigreux column to yield, after discarding a small forerun, 14 parts of purified material.

Example 5

Ninety-nine parts of dimethylamine gas was passed rapidly into a stirred mixture of 142 parts of nonaldehyde and 50 parts of lime while the temperature was maintained at 50° C. by cooling. The mixture was then stirred for one hour at room temperature and for one and one-half hours at 40° C.

The lime was removed by filtration and the product was heated on the steam-bath to remove dimethylamine. The product was then distilled to yield 75 parts of nonenyldimethylamine distilling at 46°–50° C./1 mm. This material dissolved in dilute hydrochloric acid but broke down rapidly in solution to yield the aldehyde.

The amine contained 8.20% of nitrogen (theory 8.29%) by analysis.

To 42.2 parts of nonenyldimethylamine at 50° C. there was added dropwise over a thirty minute period 13.3 parts of 87–90% formic acid while the mixture was stirred. Heating at 50° C. was continued for two hours, after which no more carbon dioxide was evolved. The product was fractionated directly to yield 39 parts of nonyldimethylamine, distilling at 67°–70° C./6 mm. This product gave a stable solution in dilute hydrochloric acid.

A sample which was purified by solution in hydrochloric acid, by ether extraction, and by reprecipitation with sodium hydroxide gave the following values: Neutralization equivalent 173 (theory 171) and a nitrogen content of 8.04% (theory 8.19%).

Example 6

To a mixture of 101 parts of diisopropylamine and 25 parts of anhydrous potassium carbonate at 50° C. there was added dropwise 71 parts of nonaldehyde. The mixture was heated at 50° C., filtered, and distilled to yield 26 parts of noneyldiisopropylamine distilling at 79°–81° C./2 mm.

To 24 parts of the above enamine was added 5.2 parts of 98–100% formic acid dropwise at 50° C. After the mixture had been heated for two hours at 50° C., evolution of carbon dioxide ceased. The product was dissolved in hydrochloric acid and extracted with ether. The water layer was made alkaline with sodium hydroxide and the product extracted with ether, dried over sodium sulfate, and distilled through a short Vigreux column to yield, after a small forerun, 15 parts of nonyldiisopropylamine distilling at 98°–100° C./4 mm. This product gave the following analytical data:

Neutralization equivalent 221 (theory 229)
Carbon, 79.2% (theory 79.2%)
Hydrogen, 14.7% (theory 14.6%)
Nitrogen, 5.97 (theory 6.17%)

Example 7

A mixture of 168 parts of diethanolamine and 35 parts of anhydrous potassium carbonate was stirred at room temperature. Thereto was added 114 parts of nonaldehyde over a period of 45 minutes while the mixture was cooled to maintain a temperature of 45° C. The reaction mixture was stirred for one and one-half hours, filtered, and distilled to yield 212 parts of impure product distilling at 127°–137° C./4–5 mm. This was dissolved in benzene and washed with water to remove diethanolamine. The product was then redistilled to yield 95 parts of nonenyldiethanolamine distilling at 105°–110° C./0.7 mm. This product gave the following analytical data: Neutralization equivalent, 227 (theory 229); and nitrogen content, 6.16% (theory 6.12%).

To 85 parts of this enamine was added 17.1 parts of 98–100% formic acid at 50° C. dropwise while the mixture was well stirred. Cooling was necessary to maintain the temperature between 55° and 60° C. The mixture was stirred an additional one and one-half hours until carbon dioxide evolution ceased. The product was distilled through a Vigreux column with return reflux to yield 72 parts of nonyldiethanolamine distilling at 147°–150° C./1.3 mm. The distillate had a neutralization equivalent of 236 (theory 231) and a nitrogen content of 6.11% (theory 6.06%).

Example 8

To a mixture of 94.2 parts of methylnonylamine and 20 parts of anhydrous potassium carbonate, stirred well at 34° C., there was added dropwise 42.6 parts of nonaldehyde. The temperature rose to 45° C. during the addition. The mixture was heated and stirred for two and one-half hours at 45°–55° C., filtered to remove potassium carbonate, and distilled to yield 47.7 parts of recovered amine distilling at 99°–114° C./20–24 mm., a small intermediate fraction, and finally 58.5 parts of nonylnonenylmethylamine distilling at 117°–121° C./0.95–1.3 mm. The distillate had a neutralization equivalent of 277 (theory 281) and contained 4.69% of nitrogen (theory 4.98%).

To 45 parts of this enamine was added 8.27 parts of 98–100% formic acid with good stirring at 40° over a fifteen minute period. The exothermic reaction raised the temperature to 55° C. and carbon dioxide was evolved rapidly. The mixture was heated and stirred for two hours at 50°–60° C., then dissolved in hydrochloric acid and extracted with ether. The aqueous solution was made basic with sodium hydroxide solution. The product was extracted therefrom with benzene, dried, and fractionated by distillation. After a small forerun, 29 parts of dinonylmethylamine was collected over the range 124°–133° C./1.5 mm.

Example 9

Sixty-seven parts of phenylpropionaldehyde was added dropwise to a mixture of 87 parts of morpholine and 25 parts of anhydrous potassium carbonate while the mixture was stirred and the temperature maintained at 50° C. Stirring and heating at 50° C. were continued for one hour. Then the mixture was cooled, filtered, and distilled to yield 52 parts of recovered morpholine and 83 parts of phenylpropenylmorpholine distilling at 120°–155° C./2.5 mm. The product solidified to a soft crystal mush. This product had a neutralization equivalent of 205 (theory 203) and a nitrogen content of 6.94% (theory 6.90%).

To 64 parts of the above enamine at 60° C. was added dropwise while the mixture was stirred 16.1 parts of formic acid. The mixture was then stirred and heated for one hour at steam-bath temperature. The product was dissolved in 18% hydrochloric acid, was extracted with ether, reprecipitated with base, extracted, dried, and fractionally distilled to yield 41.5 parts of N-phenylpropylmorpholine distilling at 120°–130° C./0.5–1 mm.

Example 10

To 84.4 parts of nonenyldimethylamine, prepared as described in a previous example, 40 parts of 98–100% formic acid was added dropwise during a thirty minute period while the mixture was stirred at 50° C. Heating was continued for thirty minutes and the reaction mixture was distilled through a good fractionating column. After recovery of 30 parts of nonyldimethylamine at 39–40° C./0.8 mm., there was obtained 64 parts of a colorless liquid distilling at 69°–72° C./2 mm. (a redistilled sample boiled sharply at 104° C./8 mm.). This material analyzed closely for $C_9H_{19}N(CH_3)_2 \cdot 2HCOOH$, as shown by the following data:

Carbon content, 59.0% (theory 59.2%)
Hydrogen content 11.0% (theory 11.0%)
Nitrogen content, 5.28% (theory 5.31%)

Fifty parts of the above product was dissolved in 50 cc. of water and thereto was added 50 cc. of 50% sodium hydroxide solution. The amine separated from the solution and was extracted with ether, dried over sodium sulfate, and distilled at 45°–50° C./2 mm. to yield 27 parts of nonyldimethylamine which had a neutralization equivalent of 167 (theory 171).

By the same general procedures there may be reduced with formic acid 5,7-dimethyloctenyldimethylamine to N-5,7-dimethyloctyl-N,N-dimethylamine, dodecenyldimethylamine to dodecyldimethylamine, N-dodecenyl-N,N-dimethylamine to dodecyldimethylamine, N-octenyl-N,N-diethanolamine to octyldiethanolamine, alpha-phenylpropenylmorpholine to alpha-phenylpropylmorpholine, gamma-butoxy-alpha-prepenyldimethylamine to gamma-butoxypropyldimethylamine, gamma-phenoxy-alpha-propenyldimethylamine to gamma - phenoxypropyldimethylamine, and so on. Whenever an enamine can be prepared, it is reducible with formic acid with saturation of the alpha,beta-olefinic linkage. The reduction is efficient and is accomplished under vary mild conditions in excellent yield.

There are several sub-classes of enamines, each of which has some special interest. In one such class there are enamines of the structure

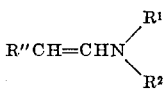

where R″ is a hydrocarbon group. In another, the hydrogen on the beta-carbon atom is replaced with a hydrocarbon group, R′. Thus, R′ and R″ are both hydrocarbon groups, such as alkyl and alkyl or alkyl and phenyl. In preferred types of compounds R″ is an alkyl group of not over 14 carbon atoms and R′ in the case of the latter sub-class is an alkyl group of not over four carbon atoms, R¹ is a methyl group, and R² is an alkyl group of not over 12 carbon atoms. In another type of compound, R¹ and R² together form a divalent chain which jointly with the nitrogen forms a heterocycle.

I claim:

1. A process of preparing tertiary amines which comprises reacting together below 100° C., with liberation of carbon dioxide, formic acid and an enamine of the formula

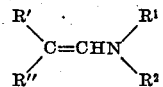

wherein R′ is a member of the class consisting of hydrogen and aliphatic hydrocarbon groups of not over four carbon atoms, R″ is a member of the class consisting of hydrocarbon groups, alkoxyalkyl groups, and phenoxyalkyl groups of not over fourteen carbon atoms, R¹ and R² are members of the class consisting of hydrocarbon groups joined to nitrogen at a non-aromatic carbon atom thereof and hydroxyalkyl groups when R¹ and R² are taken individually and when taken together the saturated divalent chains —CH₂CH₂CH₂CH₂—, —CH₂CH₂CH₂CH₂—, —CH₂CH₂OCH₂CH₂— and —CH₂CH₂SCH₂CH₂— which form a heterocycle with the nitrogen.

2. The process of claim 1 in which the temperature of reaction is between 50° and 100° C.

3. A process according to claim 2 in which the tertiary amine formed by reaction of enamine and formic acid is separated as an amine salt of a strong acid and said salt is reacted with a strong base to liberate purified tertiary amine.

4. A process of preparing tertiary amines which comprises reacting together at 50° to 100° C. formic acid and an enamine of the formula

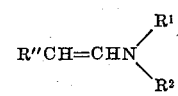

wherein R″ is an alkyl group of not over fourteen carbon atoms, R¹ is a methyl group and R² is an alkyl group of not over twelve carbon atoms.

5. A process of preparing tertiary amines which comprises reacting together at 50° to 100° C. formic acid and an enamine of the formula

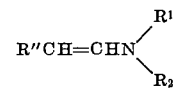

wherein R″ is an alkyl group of not over fourteen carbon atoms and R¹ and R² together form the saturated divalent chain

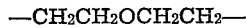

forming a heterocycle with the nitrogen.

6. A process of preparing N-butylmorpholine which comprises reacting together between 50° and 100° C. formic acid and the enamine

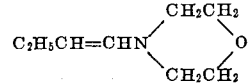

7. A process of preparing N-heptylpiperidine which comprises reacting together between 50° and 100° C. formic acid and the enamine

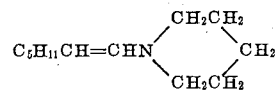

8. A process of preparing nonyldimethylamine which comprises reacting together between 50° and 100° C. formic acid and the enamine

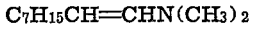

9. A process of preparing nonyldiisopropylamine which comprises reacting together between 50° and 100° C. formic acid and the enamine $$C_7H_{15}CH=CHN(iso\text{-}C_3H_7)_2$$

10. The process of preparing nonyldiethanolamine which comprises reacting together between 50° and 100° C. formic acid and the enamine $$C_7H_{15}CH=CHN(C_2H_4OH)_2$$

PETER L. DE BENNEVILLE.

REFERENCES CITED

The following references are of record in the file of this patent:

UNITED STATES PATENTS

| Number | Name | Date |
|---|---|---|
| 2,101,332 | Frankenburger et al. | Dec. 7, 1937 |
| 2,101,333 | Frankenburger et al. | Dec. 7, 1937 |
| 2,108,147 | Speer | Feb. 15, 1938 |
| 2,163,099 | Maxwell | June 20, 1939 |
| 2,273,141 | Reppe et al. | Feb. 17, 1942 |
| 2,339,314 | Zerwerk et al. | Jan. 18, 1944 |
| 2,366,534 | Kirby | Jan. 2, 1945 |

FOREIGN PATENTS

| Number | Country | Date |
|---|---|---|
| 297,847 | Germany | May 24, 1917 |

OTHER REFERENCES

Wallach: Annalen (Liebig's), vol. 343 (1905), pp. 54–59, 69, and 73.

Mannich et al.: Ber. der Deu. Chim., vol. 69B (1935), pp. 2106–2123.